United States Patent
Mandic et al.

(10) Patent No.: US 9,766,952 B2
(45) Date of Patent: Sep. 19, 2017

(54) REVERSE LAUNCH PROTOCOL

(71) Applicant: MICROSOFT TECHNOLOGY LICENSING, LLC, Redmond, WA (US)

(72) Inventors: Mirko Mandic, Seattle, WA (US); Brian Uphoff, Seattle, WA (US); Jonathan Gordner, Seattle, WA (US); Richie Fang, Bellevue, WA (US); Chaitanya Dev Sareen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/975,046

(22) Filed: Aug. 23, 2013

(65) Prior Publication Data
US 2015/0058869 A1   Feb. 26, 2015

(51) Int. Cl.
G06F 3/00 (2006.01)
G06F 9/44 (2006.01)
G06F 9/46 (2006.01)
G06F 13/00 (2006.01)
G06F 9/54 (2006.01)

(52) U.S. Cl.
CPC ............... *G06F 9/54* (2013.01); *G06F 9/461* (2013.01)

(58) Field of Classification Search
CPC ....................................................... G06F 9/54
USPC ....................................................... 719/328
See application file for complete search history.

(56) References Cited

U.S. PATENT DOCUMENTS

| 7,120,914 B1 | 10/2006 | Manthos et al. |
| 7,512,952 B1 * | 3/2009 | Liu et al. ............... 718/108 |
| 7,587,392 B2 | 9/2009 | Jhaveri et al. |
| 8,745,168 B1 * | 6/2014 | Singleton et al. ........... 709/219 |
| 2008/0235594 A1 | 9/2008 | Bhumkar et al. |

OTHER PUBLICATIONS

"Guidelines and Checklist for Search (Windows Store Apps)", Retrieved at <<http://msdn.microsoft.com/en-us/library/windows/apps/hh465233.aspx>>, Apr. 15, 2012, pp. 19.
"Tips for using Bing on Windows 8", Retrieved at <<http://onlinehelp.microsoft.com/en-us/bing/jj684589.aspx>>, Jan. 16, 2013, pp. 6.

(Continued)

Primary Examiner — Timothy A Mudrick

(57) ABSTRACT

One or more techniques and/or systems are provided for implementing a reverse protocol launch. For example, the reverse protocol launch may be implemented between apps (e.g., as an app-to-app protocol) such that a user may navigate between apps in a contextually relevant manner using the reverse protocol launch. In an example, a search app may display vacation search results based upon a search query. Responsive to a selection of a vacation movie search result, a transition to a movie app may occur. A context, specifying a contextual state of the search app (e.g., information regarding the vacation search results, the search query, etc.), may be sent to the movie app. The movie app may implement a reverse protocol launch using the context to transition from the movie app back to the search app in the contextual state (e.g., the search app may be repopulated with the vacation search results, etc.).

20 Claims, 13 Drawing Sheets

(56) References Cited

OTHER PUBLICATIONS

Ostrander, Jason., "Seven Tips for Proper Navigation in Android Apps", Retrieved at <<http://www.peachpit.com/articles/article.aspx?p=1874864>>, Jun. 14, 2012, pp. 4.
"Navigation with Back and Up", Retrieved at <<http://developer.android.com/design/patterns/navigation.html>>, Jan. 14, 2012, pp. 11.
"Navigation Design for Windows Store Apps", Retrieved at <<http://msdn.microsoft.com/en-us/library/windows/apps/hh761500.aspx>>, Apr. 19, 2012, pp. 13.
"International Search Report & Written Opinion Received for PCT Application No. PCT/US2014/051573", Mailed Date: Oct. 30, 2014, 9 Pages.
"Second Written Opinion Issued in PCT Application No. PCT/US2014/051573", Mailed Date: Jul. 17, 2015, 6 Pages.
Reply Written Opinion cited in PCT Application No. PCT/US2014/051532 dated Jun. 11, 2015, 7 pgs.
"International Preliminary Report on Patentability Issued in PCT Application No. PCT/US2014/051573", Mailed Date: Oct. 8, 2015, 7 Pages.

* cited by examiner

REVERSE LAUNCH PROTOCOL

BACKGROUND

Many computing environments may host multiple applications. For example, an operating system of a tablet device may host a map application, a web browser application, a music application, and/or other applications. The operating system may manage such application in a manner that may allow a user to switch between applications. For example, the user may view a website through the web browser application in a foreground state, and then the user may switch from the web browser application (e.g., such that the operating system places the web browser application into a background state) to the music application (e.g., such that the operating system places the music application into the foreground state). Such switching is managed by the operating system, and is thus transparent to the applications. For example, the music application may lack information regarding how the music application was launched and/or switched to (e.g., the music application may not have knowledge of the web browser application and/or may not have knowledge that the user switched from the web browser application to the music application). In this way, the operating system may manage multiple applications on the tablet device.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for implementing a reverse protocol launch are provided herein. For example, a reverse protocol launch may be implemented between apps as an app-to-app protocol. For example, a second app, being launched by a first app, may be provided with contextual information about the first app so that the second app can transition from the second app to the first app in a contextually relevant state (e.g., a contextual state of the first app before the second app was launched). In this way, a user may navigate between apps, while preserving contextual states of such apps (e.g., a video app may retain a current playback position of a video; a shopping app may retain purchasing information provided by the user; an operating system search interface, such as a search charm, may retain a scroll position and search result information; etc.), using reverse protocol launch functionality exposed by the apps (e.g., the second app may overload functionality of a user interface element, such as a back button, with a first context used to transition from the second app to the first app in a first contextual state).

In an example, a first app may provide a first user interface, which may be experienced by a user. The first user interface may be displayed according to a first contextual state (e.g., an email app may display a set of search results comprising one or more vacation emails corresponding to a user email search query "show me my vacation emails"). Responsive to user input corresponding to a second app (e.g., the user may click on a vacation movie link attached to a vacation email), a launch request may be sent from the first app to the second app. In this way, the second app may be launched into an operational state (e.g., a movie app may be launched to play a vacation movie corresponding to the vacation movie link). A first context, specifying the first contextual state of the first app, may be sent to the second app (e.g., information regarding the user email search query "show me my vacation emails", the set of search results, one or more vacation emails that were visible through the first user interface, a scroll position, a user selection of an email, etc.). In an example, the second app may expose reverse protocol launch functionality (e.g., by overloading a back button using the first context) that may be invoked by the user to transition from the second app to the first app in the first contextual state. For example, the first app may receive a reverse protocol launch command from the second app. The reverse protocol launch command may comprise the first context. The first app may repopulate the first user interface utilizing the first content. In this way, apps may facilitate contextual switching between apps (e.g., without relying upon operating system functionality and/or user input through the operating system).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
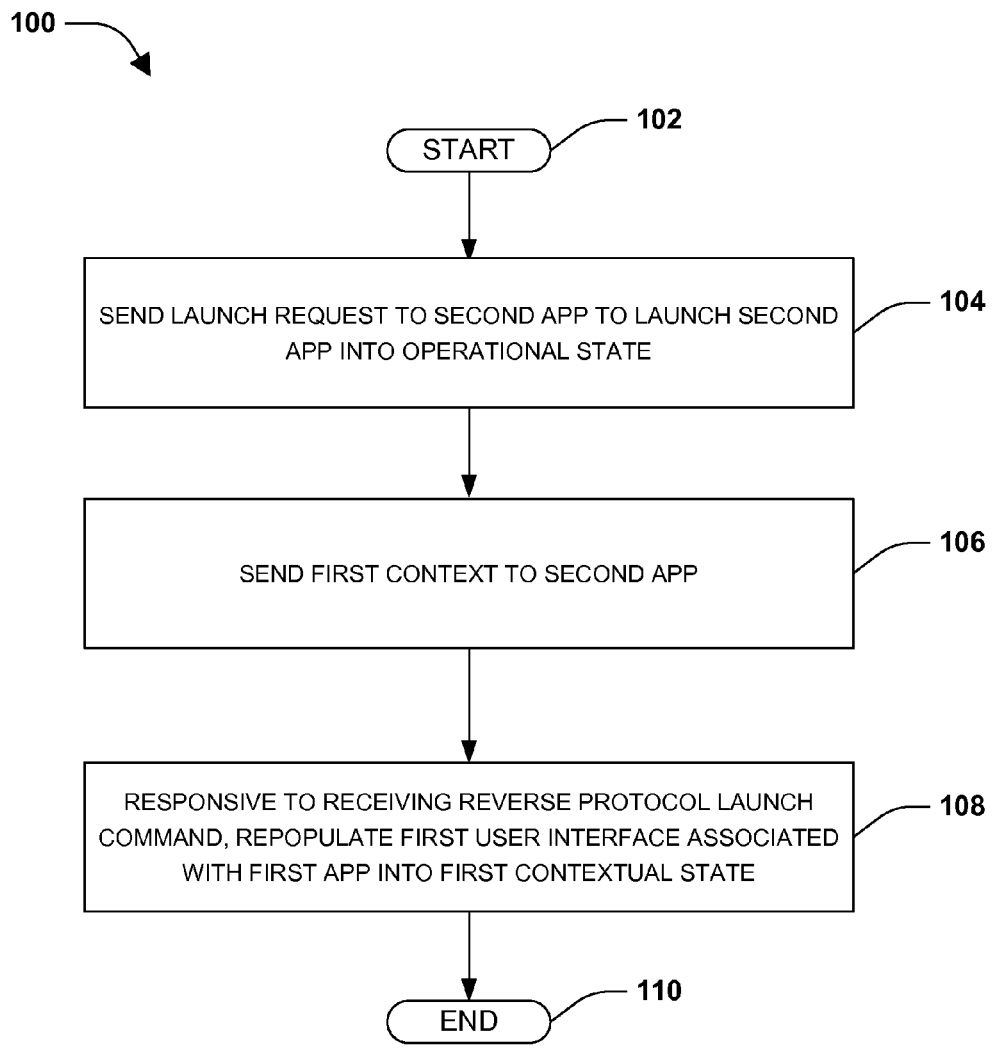
FIG. 1 is a flow diagram illustrating an exemplary method of facilitating a reverse protocol launch by a first app.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of facilitating a reverse protocol launch is illustrated by an exemplary method 100 of FIG. 1. At 102, the method starts. A first app may be hosted within a computing environment in an operational state (e.g., an execution state). The first app may provide a first user interface according to a first contextual state. For example, a shopping app may display information relating to a role playing game (RPG) video game for sale. At 104, responsive to identifying, by the first app, a request to launch a second app, a launch request may be sent to the second app to launch the second app into the operational state (e.g., initialize the second app; execute the second app; bring the second app into a foreground state; etc.). For example, the shopping app (e.g., first app) may display a link to a video review for the RPG video game. The video review may be played by the second app, such as a video app, based upon a selection of the link. In this way, the shopping app (e.g., first app) may launch the video app (e.g., second app) to play the video review.

At 106, the first app may send a first context to the second app. The first context may specify a first contextual state of the first app before the second app is launched. For example, the first context may be indicative of a scroll position of the first user interface, a string specifying one or more user interface values for user interface elements within the first app user interface (e.g., a current price; a name of the RPG video game; a quantity selected from a dropdown menu; a video game console name typed into a text box; etc.), user specified data populated within the first app user interface (e.g., a current bid price inputted by the user into a bid text box); one or more search results populated within the first app user interface (e.g., the first context may indicate a query "RPG video game", submitted by the user, used to display the information relating to the RPG video game), a state of a user interface element (e.g., a checkbox may have been selected), a playback state of multimedia content associated with the first app (e.g., a current playtime of an audio description of the RPG video game that was being played), and/or a variety of other information that may be used by the first app to repopulate the first user interface according to the first contextual state. In this way, the user may be transitioned to the second app. In an example, the second app may expose reverse protocol launch functionality that may be invoked by the user to transition from the second app to the first app (e.g., the second app may overload functionality of a back button with the first context and/or reverse protocol launch functionality used to launch the first app for repopulation according to the first contextual state). It may be appreciated that in one example, the second app implements the reverse protocol launch command, as opposed to relying upon an operating system to handle such functionality. In this way, the reverse protocol launch may be implemented as an app-to-app protocol implemented between the first app and the second app.

At 108, responsive to receiving, from the second app, a reverse protocol launch command comprising the first context, repopulating the first user interface utilizing the first context. For example, the shopping app may repopulate the first user interface with the information relating to the RPG video game for sale so that the first user interface substantially the same as before the transition from the shopping app to the video app. In this way, the second app may transition the user from the second app to the first app in a contextually aware manner so that the first app may repopulate the first user interface according to the first contextual state.

In an example, the first app may transition to a second contextual state. For example, responsive to the user submitting a search query "running shoes", a set of running shoe results may be displayed by the shopping app (e.g., first app). The shopping app may display a link to a sports shoe social network profile. Responsive to identifying a second request to launch a third app, a second launch request, may be sent to the third app to launch the third app into the operational state. For example, the user may invoke the link to open a social network app to the sports shoe social network profile. The first app may send a second context to the third app. The second context may specify a second contextual, state of the first app before the third app is launched. For example, the second context may be indicative of the search query "running shoes", the set of running shoe results, user specified data (e.g., a shoe color), a user interface value for a user interface element (e.g., a selection of a size from a dropdown menu), and/or a variety of other information that may be used by the first app to repopulate the first user interface according to the second contextual state. In this way, the user may be transitioned to the third app. In an example, the third app may expose reverse protocol launch functionality that may be invoked by the user to transition from the third app to the first app in the second contextual state.

Responsive to receiving, from the third app, a second reverse protocol launch command comprising the second context, the first app may repopulate the first user interface utilizing the second context. For example, the shopping app may repopulate the first user interface with the set of running shoe results so that the first user interface is substantially the same as before the user transitioned from the shopping app (e.g., first app) to the social network app (e.g., third app). In this way, the third app may transition the user from the third app to the first app in a contextually aware manner so that the first app may repopulate the first user interface according to the second contextual state. At 110, the method ends.

Figure 2:
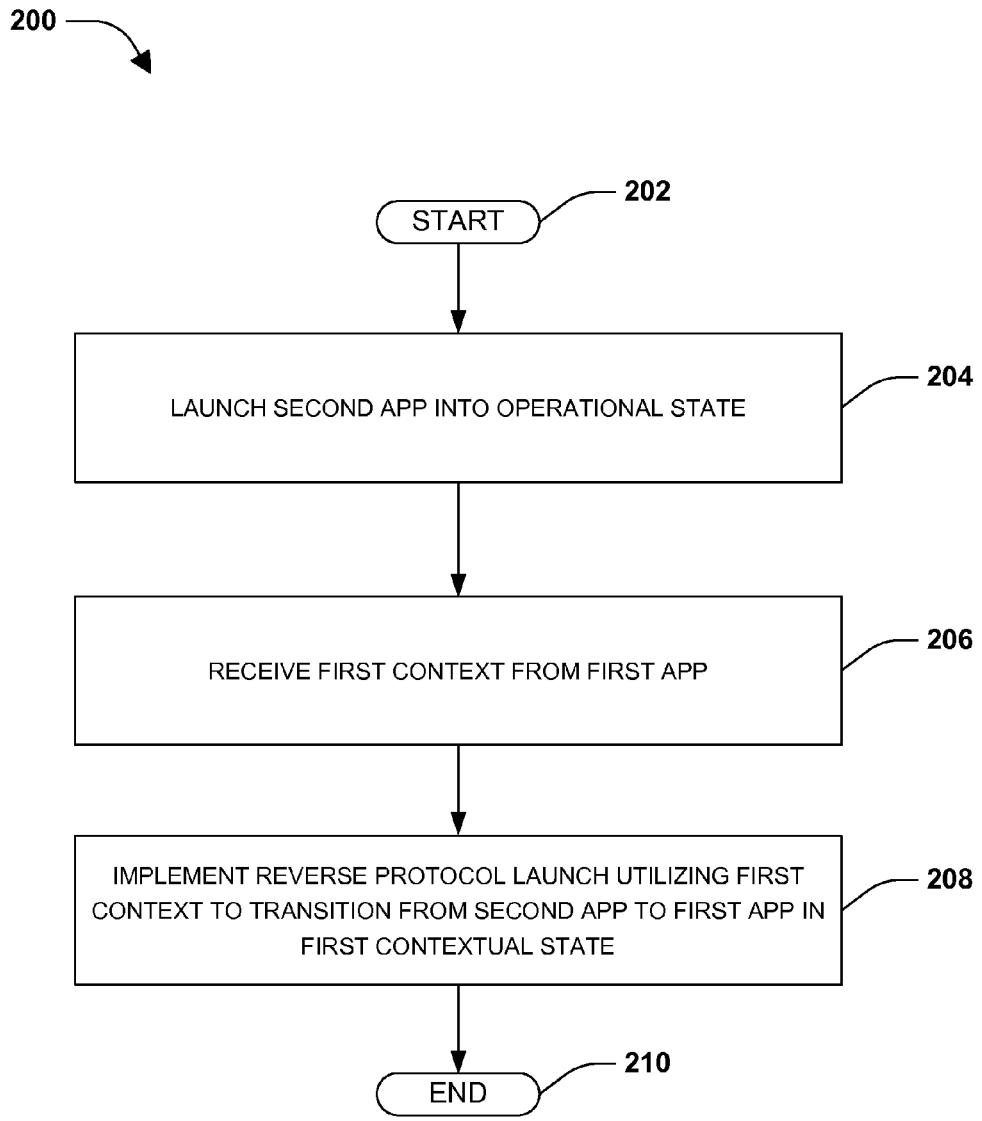
FIG. 2 is a flow diagram illustrating an exemplary method of facilitating a reverse protocol launch by a second app.

An embodiment of facilitating a reverse protocol launch is illustrated by an exemplary method 200 of FIG. 2. At 202, the method starts. A first app may be hosted within a computing environment in an operational state. The first app may provide a first user interface according to a first contextual state. For example, an operating system search interface of an operating system (e.g., a search charm) may display a set of vacation search results based upon a search query "I want to plan a vacation". The user may scroll through the set of vacation search results to a second vacation search results page comprising a vacation slideshow presentation search result, a vacation social network profile, a vacation spreadsheet, and/or other search vacation search results. Responsive to a selection of the vacation slideshow presentation search result, the first app may transition to a second app, such as a slideshow presentation app.

At 204, responsive to identifying a launch request by the first app to launch the second app, the second app may be launched into an operational state. For example, the slideshow presentation app may be initialized, executed, and/or displayed in a foreground state. At 206, the second app may receive a first context from the first app. The first context may specify the first contextual state of the first app before the second app is launched. For example, the first context may be indicative of a scroll position for the second vacation search results page, the search query "I want to plan a vacation", vacation search results populated within the second vacation search results page, etc. The second app may expose reverse protocol launch functionality, which may be invoked by the user to transition from the second app to the first app in the first contextual state. In an example, the slideshow presentation app may associate the first context and/or the reverse protocol launch functionality with a new user interface element within a second user interface associated with the second app. In another example, the slideshow presentation app may overload functionality of an existing user interface element, such as a back button, within the second user interface with the first context and/or the reverse protocol launch functionality to create an overloaded user interface element. The reverse protocol launch functionality may be implemented as an app-to-app protocol between the first app and the second app, as opposed to being implemented by the operating system (e.g., the slideshow presentation app may implement, control, and/or execute the reverse protocol launch functionality).

In an example, the reverse protocol launch functionality may be retained and/or exposed through the second user interface notwithstanding a transition away from the second app. For example, the user may transition from the second app to a third app (e.g., the user may open a music app in order to play a radio station in the background). Responsive to identifying a back transition from the third app to the second app, a user interface element (e.g., the back button), associated with the reverse protocol launch functionality, may be exposed within the second user interface.

In an example, the second app may identify a second request to launch a third app. For example, the user may select an email address link, associated with an email app, from within a vacation slideshow presentation displayed by the slideshow presentation app (e.g., second app). The second app may send a second launch request to the third app to launch the third app into a second operation state. For example, the email app may be launched to display a new email that is addressed to an email address specified by the email address link. The second app may send a second context to the third app. The second context may specify a second contextual state of the second app before the third app is launch. For example, the second context may specify a current presentation slide displayed by the slideshow presentation app. The third app may implement reverse protocol launch functionality to transition from the third app to the second app in the second contextual state. Responsive to the second app receiving a reverse protocol launch command, comprising the second context, from the third app, the second app may repopulate the second user interface utilizing the second context. For example, the slideshow presentation app may repopulate slideshow presentation information with the current presentation slide. In an example, the second app may display the reverse protocol launch functionality that may be used to transition from the second app to the first app in the first contextual state (e.g., the slideshow presentation app may retain the first context notwithstanding the user transitioning to the email app).

At 208, the second app may implement the reverse protocol launch utilizing the first context to transition from the second app to the first app in the first contextual state. The second app may pass the first context to the first app for repopulation of the first app user interface according to the first contextual state. For example, the operating system search interface may display the second vacation search results page within the first app user interface. At 210, the method ends.

In an example, an active app API may be exposed to the second app. The active app API may indicate whether the first app is active (e.g., displayed on a screen, in a foreground state, visible to a user; etc.) or not (e.g., where an operating system enables multiple apps to be displayed, presented, etc. concurrently). If the active app API indicates that the first app is active, then the second app may refrain from implementing the reverse protocol launch because the first app may already be available and/or visible to the user.

Figure 3A:
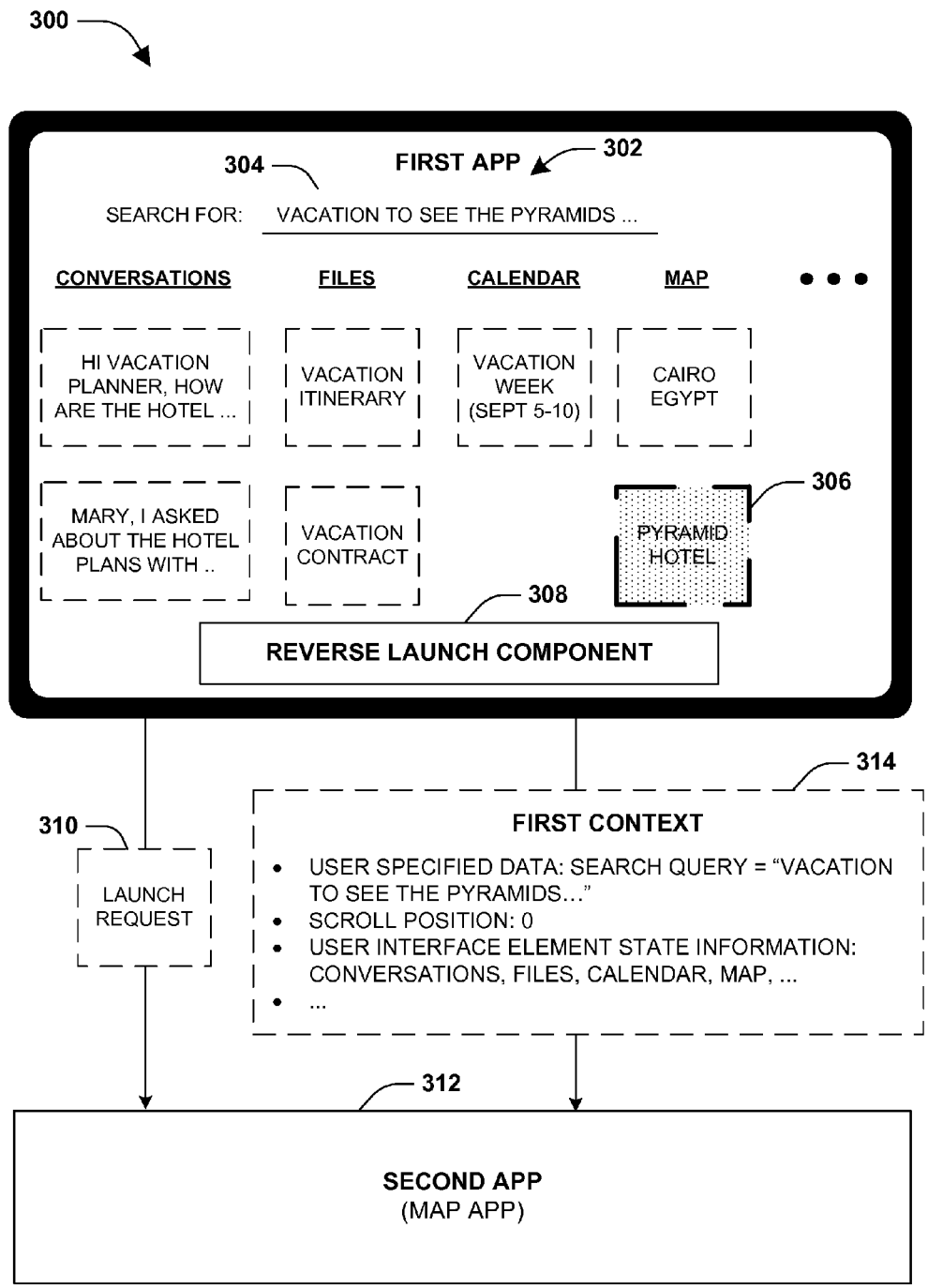
FIG. 3A is a component block diagram illustrating an exemplary system for facilitating a reverse protocol launch by sending a first context to a second app.

FIG. 3A illustrates an example of a system 300 for implementing a reverse protocol launch. The system 300 comprises a reverse launch component 308. In an example, a first app 302 (e.g., a search app) is hosted within a computing environment in an operational state. The first app 302 may display a set of search results corresponding to a search query 304 of "vacation to see the pyramids". For example, the first app 302 may display conversations, files, calendar information, map information (e.g., a pyramid hotel map location search result 306 associated with a second app 312, such as a map app), and/or other information relevant to the search query 304. The reverse launch component 308 may be configured to identify a request to launch the second app 312. For example, a user may select the pyramid hotel map location search result 306 associated with the second app 312. The reverse launch component 308 may be configured to send a launch request 310 to the second app 312 to launch the second app 312 into an operational state (e.g., FIG. 3B). The reverse launch component 308 may send a first context 314 to the second app 312. The first context 314 may specify a first contextual state of the first app 302. For example, the first context 314 may be indicative of user specified data (e.g., the search query 304 of "vacation to see the pyramids"), a scroll position (e.g., 0), user interface element state information (e.g., the set of search results, text values for labels, user interface element positions, etc.). In an example, a first instance of the reverse launch component 308 may be integrated into the first app 302 so that the first app 302 may facilitate and/or implement the reverse protocol launch in conjunction with the second app 312.

Figure 3B:
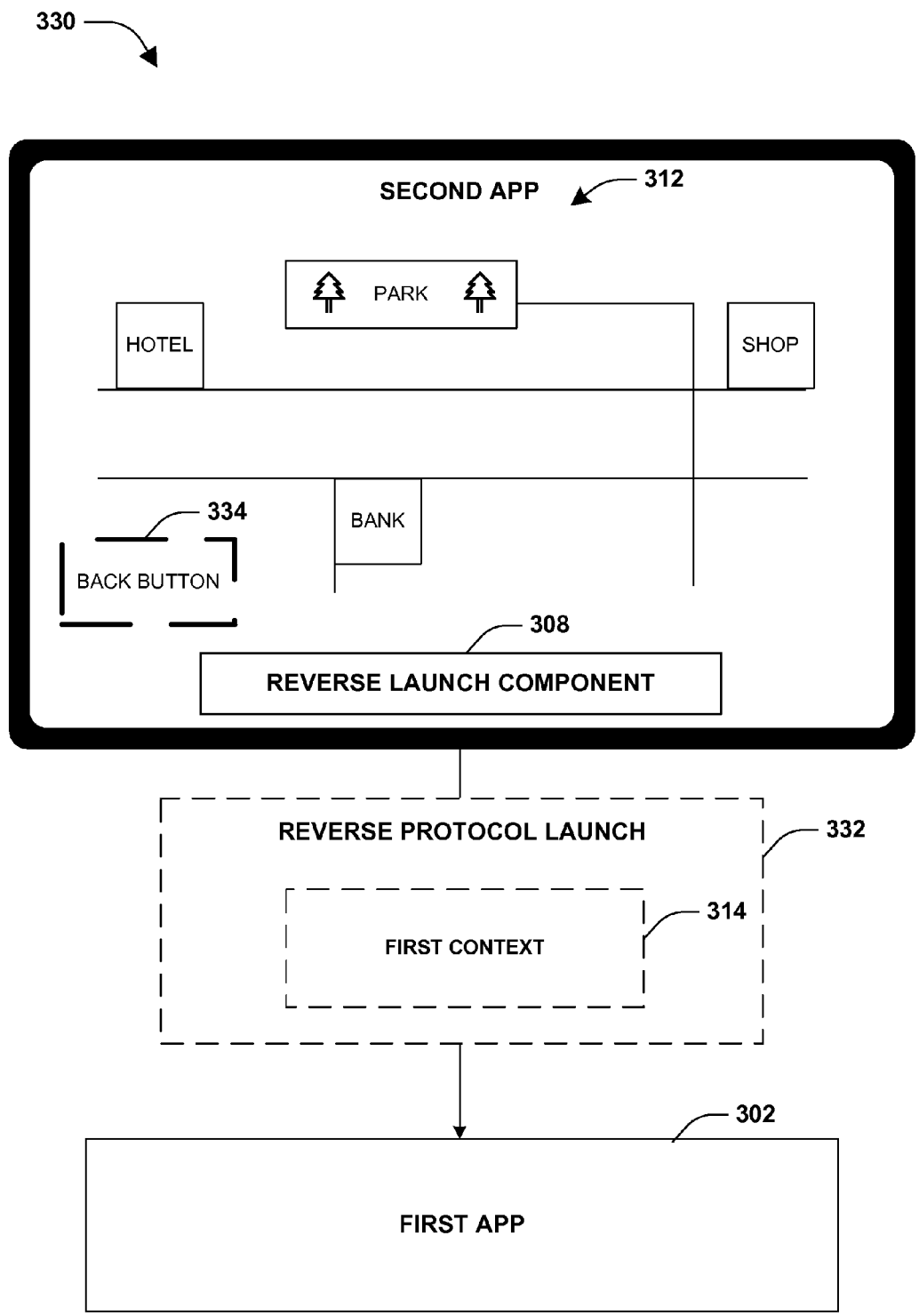
FIG. 3B is a component block diagram illustrating an exemplary system for facilitating a reverse protocol launch by implementing a reverse protocol launch.

FIG. 3B illustrates an example of a system 330 for implementing a reverse protocol launch. It may be appreciated that in one example, the system 330 corresponds to the system 300 of FIG. 3A. For example, the system 330 comprises a reverse launch component 308 (e.g., associated with a first app 302 from which the second app 312 was launched and/or provided with the first context 314 specifying a first contextual state of the first app 302). In an example, a second instance of the reverse launch component 308 may be integrated into the second app 312 so that the second app 312 may facilitate and/or implement the reverse protocol launch in conjunction with the first app 302. The second app 312 may display a map comprising a pyramid hotel map location (e.g., corresponding to the pyramid hotel map location search result 306 of FIG. 3A).

The reverse launch component 308 (e.g., the second instance of the reverse launch component 308 integrated into the second app 312) may expose reverse protocol launch functionality, which may be used to transition from the second app 312 to the first app 302 in the first contextual state. For example, the reverse launch component 308 may overload a back button 334 with the first context 314 and/or the reverse protocol launch functionality. Responsive to selection of the back button 334, the reverse launch component 308 may implement a reverse protocol launch 332 to transition from the second app 312 to the first app 302 in the first contextual state (e.g., FIG. 3C). The reverse launch component 308 may send the first context 314 to the first app 302, which may be used by the first app 302 to repopulate a first user interface of the first app 302 according to the first contextual state.

Figure 3C:
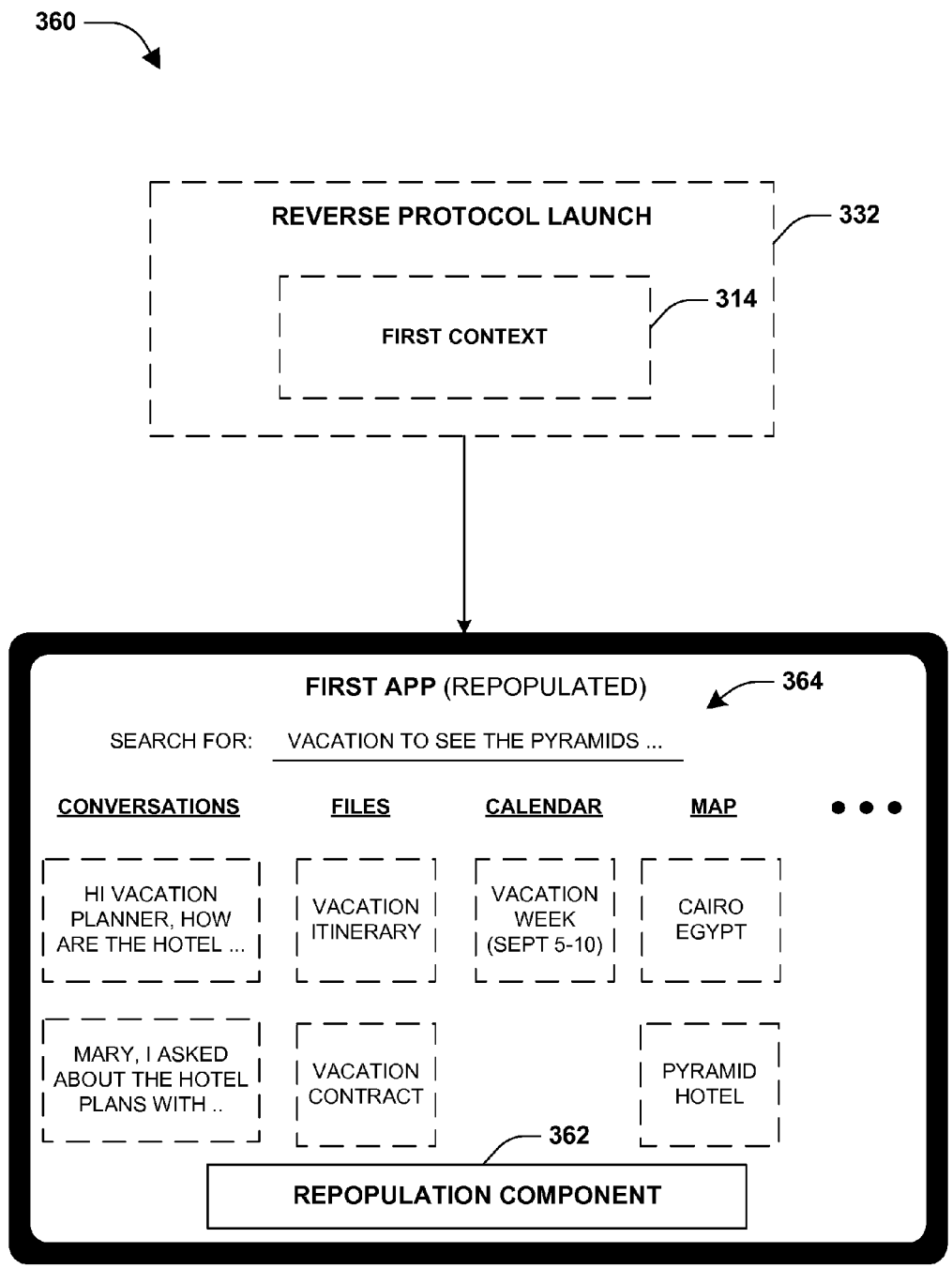
FIG. 3C is a component block diagram illustrating an exemplary system for facilitating a reverse protocol launch by repopulating a first app.

FIG. 3C illustrates an example of a system 360 for implementing a reverse protocol launch. The system 360 may comprise a repopulation component 362. It may be appreciated that in one example, the system 360 corresponds to the system 300 of FIG. 3A and/or system 330 of FIG. 3B. For example, the repopulation component 362 may be associated with a first app 302 that provided a first context 314, specifying a first contextual state of the first app 302, to a second app 312. The second app 312 may implement a reverse protocol launch 332 utilizing the first context 314 to transition from the second app 312 to the first app 302 in the first contextual state. The first app 302 may utilize the first context 314 to repopulate the first user interface of the first app 302, thus resulting in a repopulated first user interface 364. For example, the first app 302 may populate the repopulated first user interface 364 with a set of search results, such as conversations, files, calendar information, map information, and/or other information, specified by the first context 314.

In an example, the first app 302 may store reverse protocol launch implementation data specifying that the second app 312 performed the reverse protocol launch 332 to launch the first app 302. The first app 302 may utilize the reverse protocol launch implementation data when determining whether to implement reverse protocol launch functionality. For example, the first app 302 may refrain from implementing reverse protocol launch functionality with respect to the second app 312 so that a cyclical navigation scenario does not ensue where the user is transitioned back and forth between the first app 302 and the second app 312 (e.g., when using the back button 334 of the second app 312 and a back button of the first app 302). In this way, an app may maintain a navigation stack within which the app may store valid reverse protocol launch candidate apps. For example, the app may refrain from adding a candidate app into the navigation stack based upon reverse protocol launch implementation data indicating that the app is currently launched based upon a reverse protocol launch implemented by the candidate app (e.g., the candidate app would not be regarded as a valid protocol launch candidate app because the candidate app launched the app).

Figure 4A:
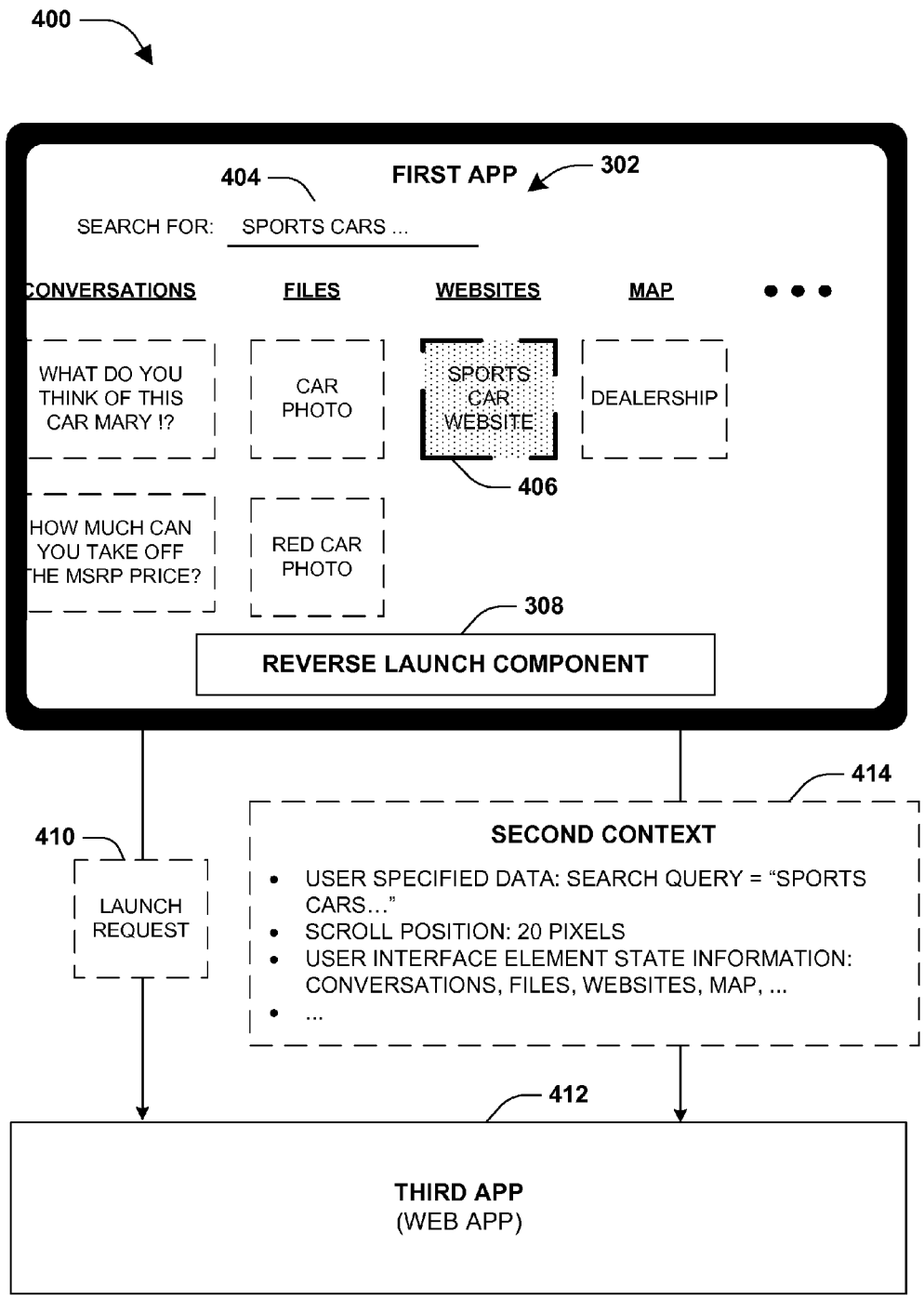
FIG. 4A is a component block diagram illustrating an exemplary system for facilitating a reverse protocol launch by sending a second context to a third app.

FIG. 4A illustrates an example of a system 400 for implementing a reverse protocol launch. It may be appreciated that in one example, the system 400 corresponds to the system 300 of FIG. 3A. For example, the system 400 comprises a reverse launch component 308 associated with a first app 302 (e.g., a search app). The first app 302 may display a set of search results corresponding to a search query 404 of "sports cars". For example, the first app 302 may display conversations, files, websites (e.g., a sports car website link search result 406 associated with a third app 412, such as a web app), map information, and/or other information relevant to the search query 404. The user may scroll from an initial position to a scrolled position (e.g., the user may begin to scroll through the set of search results from left to right in order to see other search results not initially displayed).

The reverse launch component 308 may be configured to identify a request to launch the third app 412. For example, a user may select the sports car website link search result 406 associated with the third app 412. The reverse launch component 308 may be configured to send a second launch request 410 to the third app 412 to launch the third app 412 into an operational state (e.g., FIG. 4B). The reverse launch component 308 may send a second context 414 to the third app 412. The second context 414 may specify a second contextual state of the first app 302. For example, the second context 414 may be indicative of user specified data (e.g., the search query 404 of "sports car"), a scroll position (e.g., the scrolled position, such as a 20 pixel displacement in an X direction), user interface element state information (e.g., the set of search results corresponding to sports cars, text values for labels, user interface element positions, etc.). In an example, the second context 414 may be different than the first context 314 illustrated in FIG. 3A (e.g., the user may have submitted the search query 304 to view search results associated with vacations and pyramids, then the user may have viewed the pyramid hotel through the second app 312, next the second app may have performed a reverse protocol launch back to the first app 302, and finally the user may have submitted the search query 404 to view search results associated with sports cars). In an example, a first instance of the reverse launch component 308 may be integrated into the first app 302 so that the first app 302 may facilitate and/or implement the reverse protocol launch in conjunction with the third app 412.

Figure 4B:
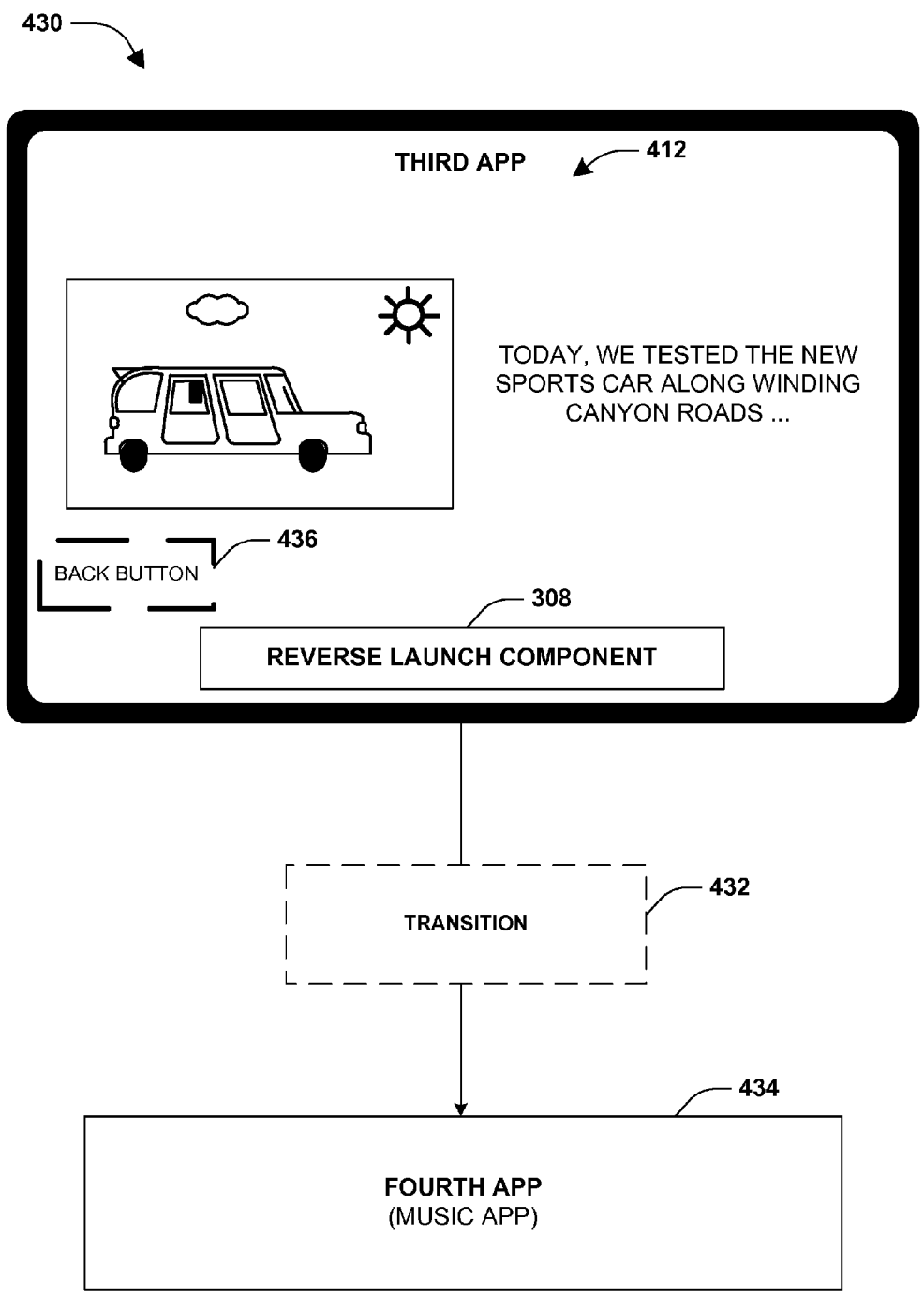
FIG. 4B is a component block diagram illustrating an exemplary system for facilitating a reverse protocol launch by retaining a second context.

FIG. 4B illustrates an example of a system 430 for implementing a reverse protocol launch. It may be appreciated that in one example, the system 430 corresponds to the system 400 of FIG. 4A. For example, the system 430 comprises a reverse launch component 308 (e.g., associated with a first app 302 from which the third app 412i was launched and/or provided with a'second context 414 specifying a second contextual state of the first app 302). In an example, a third instance of the reverse launch component 308 may be integrated into the third app 412 so that the third app 412 may facilitate and/or implement the reverse protocol launch in conjunction with the first app 302. The third app 412 may display a sports car website corresponding to a sports car website link search result 406 of FIG. 4A).

The reverse launch component 308 (e.g., the third instance of the reverse launch component 308 integrated into the third app 412) may expose reverse protocol launch functionality, which may be used to transition from the third app 412 to the first app 302 in the second contextual state. For example, the reverse launch component 308 may overload a back button 436 with the second context 414 and/or the reverse protocol launch functionality. Responsive to selection of the back button 436, the reverse launch component 308 may implement a reverse protocol launch 452 to transition from the third app 412 to the first app 302 in the second contextual state (e.g., FIG. 4D and FIG. 4E).

In an example, a transition 432 from the third app 412 to a fourth app 434 may be identified. For example, a user may open a music app in order to play a radio station. While the user is transitioned away from the third app 412, such as during interaction with the fourth app 434, the third app 412 may retain the second context 414 specifying the second contextual state of the first app 302 and/or may continue to expose the reverse protocol launch functionality (e.g., through the back button 436) so that the user may transition from the third app 412 to the first app 302 in the first contextual state (e.g., at a later point in time such as after the user navigates back to the third app 412 from the fourth app 434).

Figure 4C:
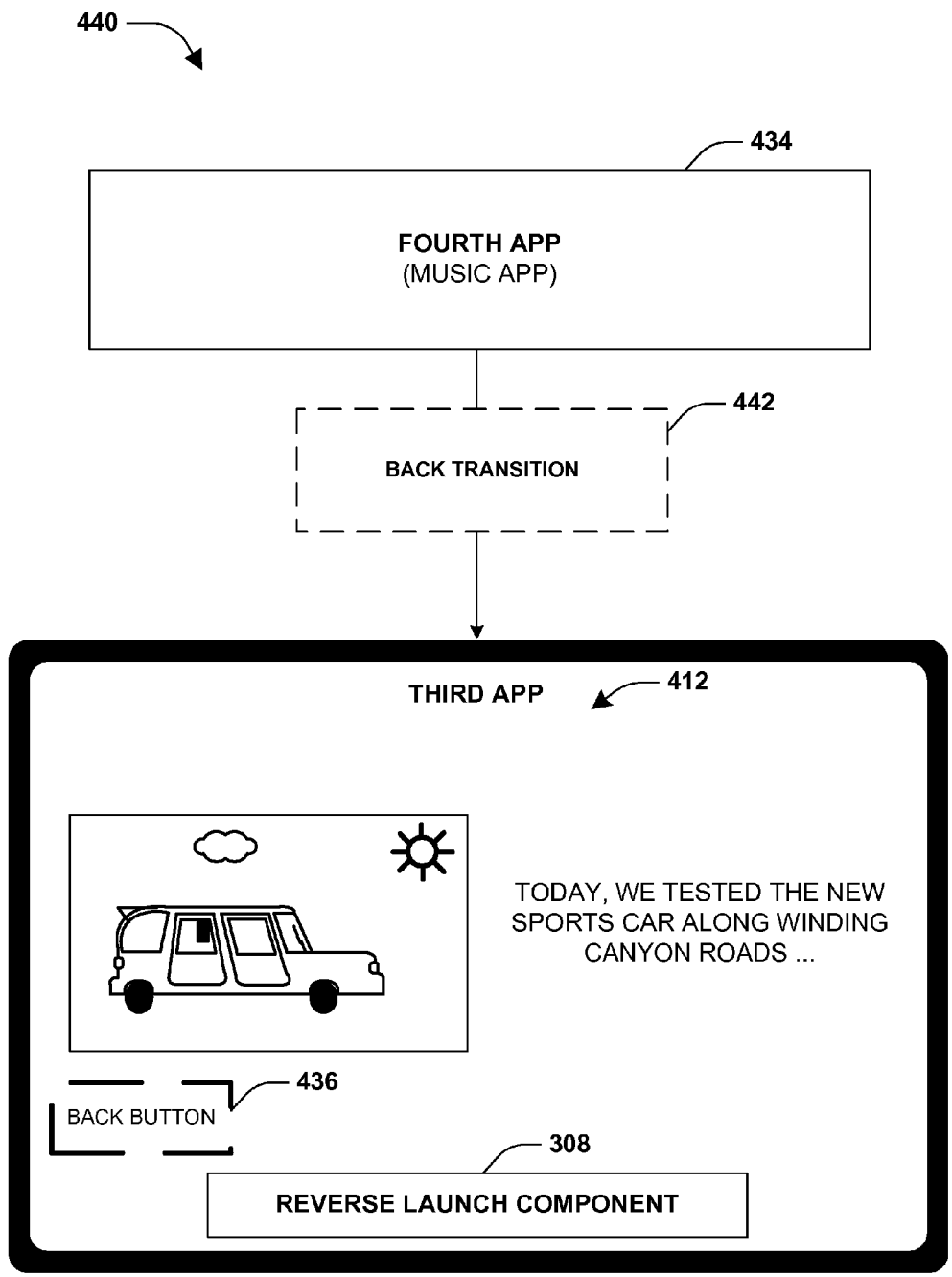
FIG. 4C is a component block diagram illustrating an exemplary system for facilitating a reverse protocol launch by exposing reverse protocol launch functionality.

FIG. 4C illustrates an example of a system 440 for implementing a reverse protocol launch. It may be appreciated that in one example, the system 430 corresponds to the system 400 of FIG. 4A and/or the system 430 of FIG. 4B. For example, the system 440 comprises a reverse launch component 308 (e.g., associated with a first app 302 from which the third app 412 was launched and/or provided with a second context 414 specifying a second contextual state of the first app 302). In an example, a user may have transitioned 432 from the third app 412 to a fourth app 434 to play a radio station (e.g., FIG. 4B). Responsive to identifying a back transition 442 from the fourth app 434 to the third app 412, a user interface element (e.g., a back button 436), associated with reverse protocol launch functionality, may be exposed within a third user interface associated with the third app 412. In this way, the user may invoke the back button 436 to implement a reverse protocol launch to transition from the third app 412 to the first app 302 in the second contextual state (e.g., FIG. 4D and FIG. 4E).

Figure 4D:
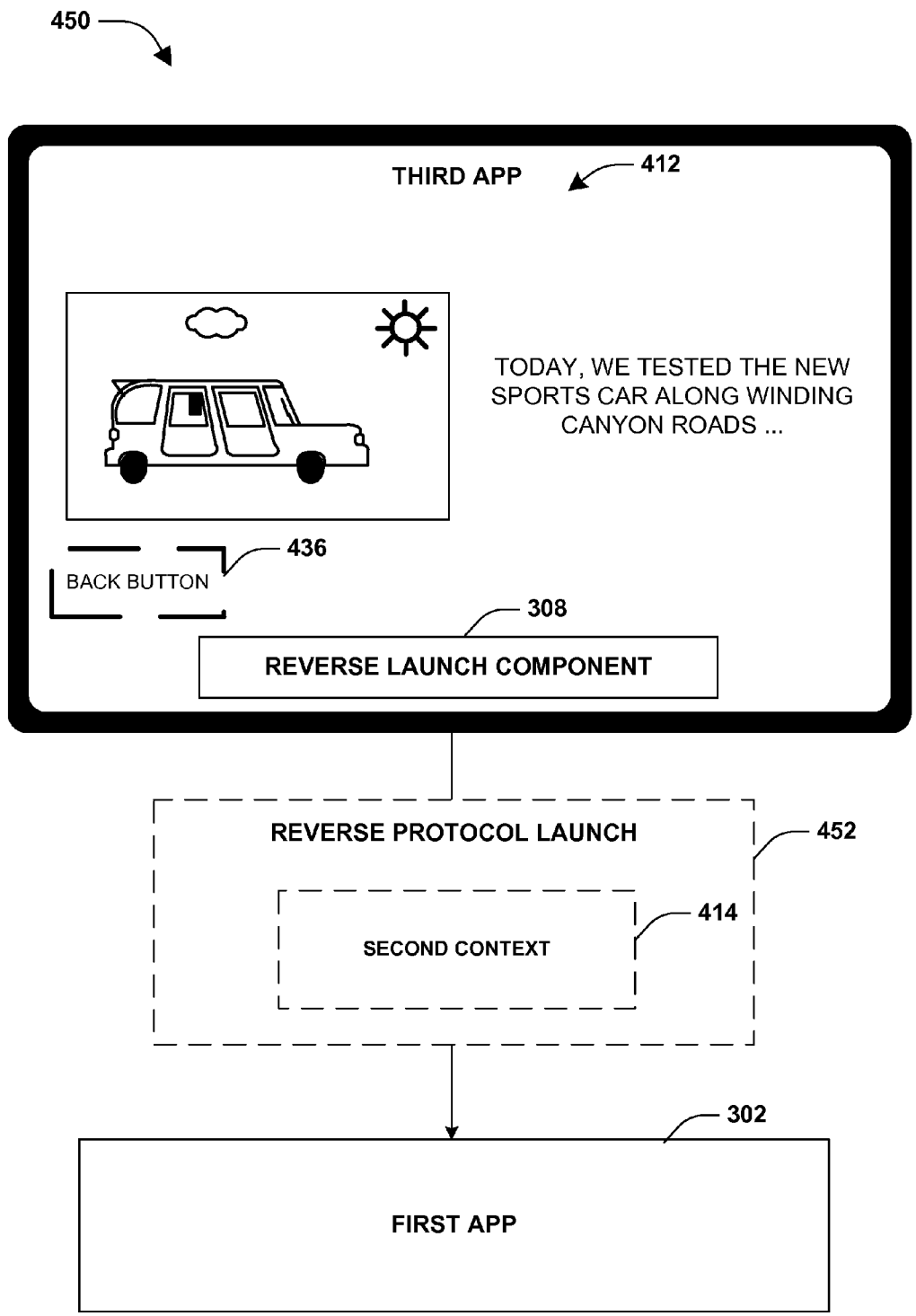
FIG. 4D is a component block diagram illustrating an exemplary system for facilitating a reverse protocol launch by implementing a reverse protocol launch.

FIG. 4D illustrates an example of a system 450 for implementing a reverse protocol launch. It may be appreciated that in one example, the system 450 corresponds to the system 400 of FIG. 4A, the system 430 of FIG. 4B, and/or the system 440 of FIG. 4C. For example, the system 450 comprises a reverse launch component 308 (e.g., associated with a first app 302 from which the third app 412 was launched and/or provided with a second context 414 specifying a second contextual state of the first app 302). In an example, a third instance of the reverse launch component 308 may be integrated into the third app 412 so that the third app 402 may facilitate and/or implement the reverse protocol launch in conjunction with the first app 302. The reverse launch component 308 (e.g., the third instance of the reverse launch component 308 integrated into the third app 412) may expose reverse protocol launch functionality, which may be used to transition from the third app 412 to the first app 302 in the second contextual state. For example, the reverse launch component 308 may overload a back button 436 with the second context 414 and/or the reverse protocol launch functionality. Responsive to selection of the back button 436, the reverse launch component 308 may implement a reverse protocol launch 452 to transition from the third app 412 to the first app 302 in the second contextual state (e.g., FIG. 4E). The reverse launch component 308 may send the second context 414 to the first app 302, which may be used by the first app 302 to repopulate a first user interface of the first app according to the second contextual state.

Figure 4E:
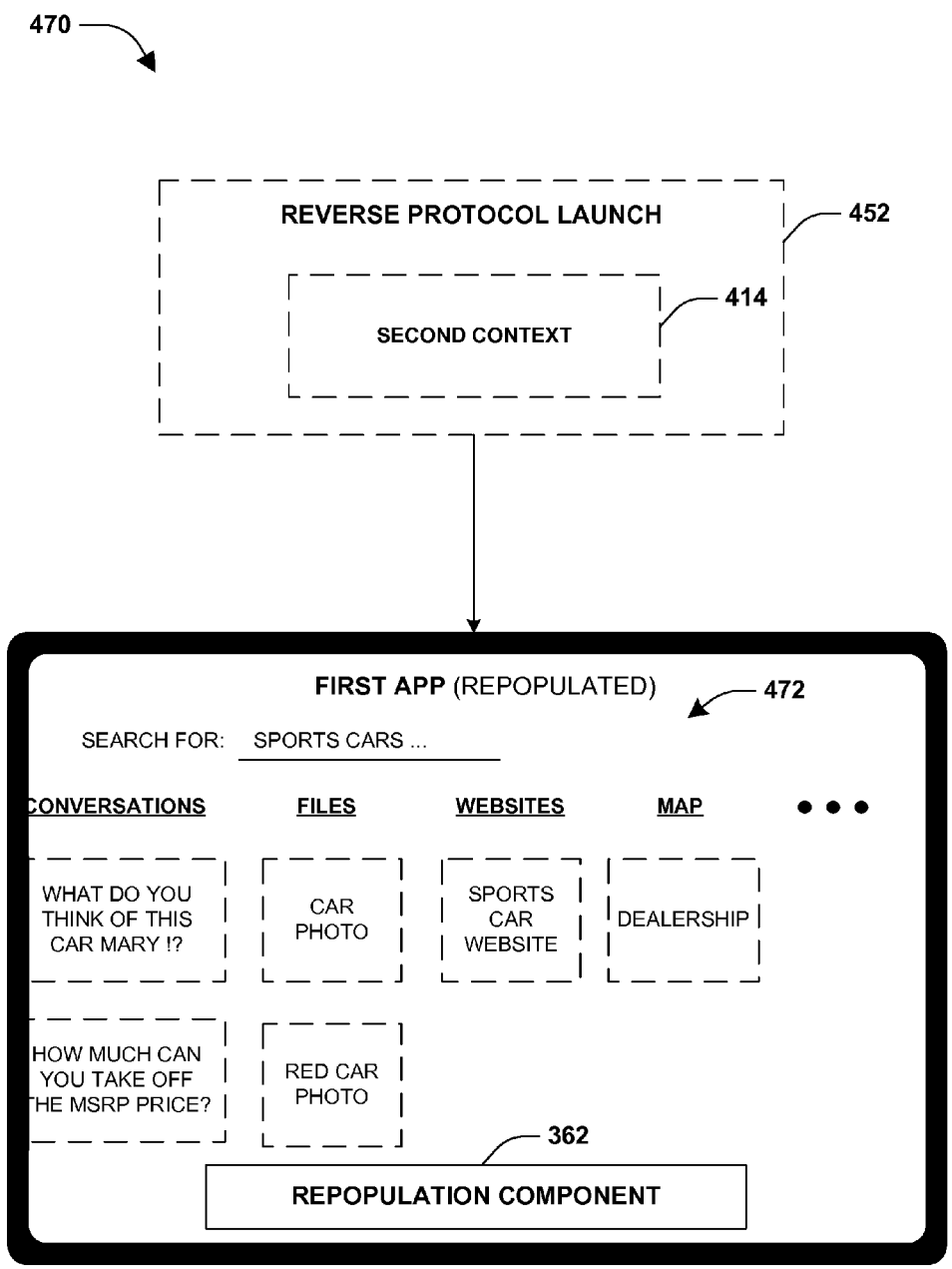
FIG. 4E is a component block diagram illustrating an exemplary system for facilitating a reverse protocol launch by repopulating a first app.

FIG. 4E illustrates an example of a system 470 for implementing a reverse protocol launch. The system 470 may comprise a repopulation component 362. It may be appreciated that in one example, the system 470 corresponds to the system 400 of FIG. 4A, system 430 of FIG. 4B, system 440 of FIG. 4C, and/or system 450 of FIG. 4D. For example, the repopulation component 362 may be associated with a first app 302 that provided a second context 414, specifying a second contextual state of the first app 302, to a third app 412. The third app 412 may implement a reverse protocol launch 452 utilizing the second context 414 to transition from the third app 412 to the first app 302. The first app 302 may utilize the second context 414 to repopulate a first user interface of the first app 302 according to the second contextual state, thus resulting in a repopulated first user interface 472. For example, the first app 302 may populate the repopulated first user interface 472 with a set of search results, such as conversations, files, websites, map information, and/or other information, specified by the second context 414.

Figure 5:
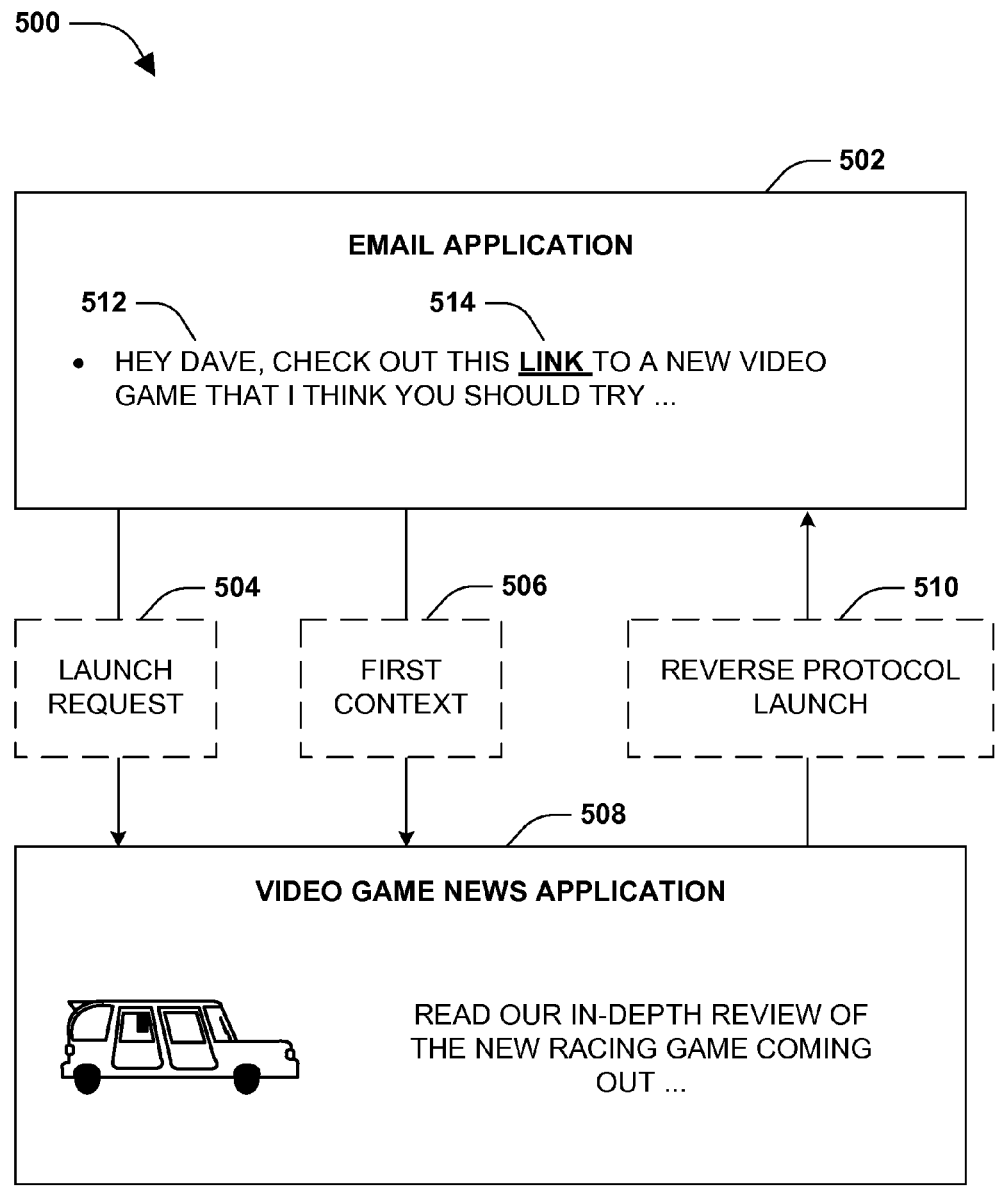
FIG. 5 is an illustration of an example of facilitating a reverse protocol launch.

FIG. 5 illustrates an example 500 of a reverse protocol launch 510. An email application 502 may be hosted within a computing environment. The email application 502 may display a video game email 512, as a first contextual state of the email application 502, based upon an email search "show me my emails regarding video games". The video game email 512 may comprise a video game review link 514 associated with a video game news application 508. A game launch request 504 may be detected based upon selection of the video game review link 514. Accordingly, the email application 502 may launch the video game news application 508. The email application 502 may send a first context 506 specifying the first contextual state of the email application 502 to the video games news application 508 (e.g., a scroll position of the email application 502, the email search "show me my emails regarding video games", an identifier of the video game email 512, etc.).

The video game news application 508 may display a video game review corresponding to the video game review link 514. The video game news application 508 may overload a swipe gesture (e.g., a finger swipe from right to left across the video game news application 508) with the first context 506 and/or reverse protocol launch functionality to create an overloaded swipe gesture. Responsive to identifying the overloaded swipe gesture, the video game news application 508 may implement a reverse protocol launch 510 to transition from the video game news application 508 to the email application 502 in the first contextual state. For example, the video game news application 508 may send the first context 506 to the email application 502. The email application 502 may utilize the first context 506 to repopulate the email application 502 according to the first contextual state.

Figure 6:
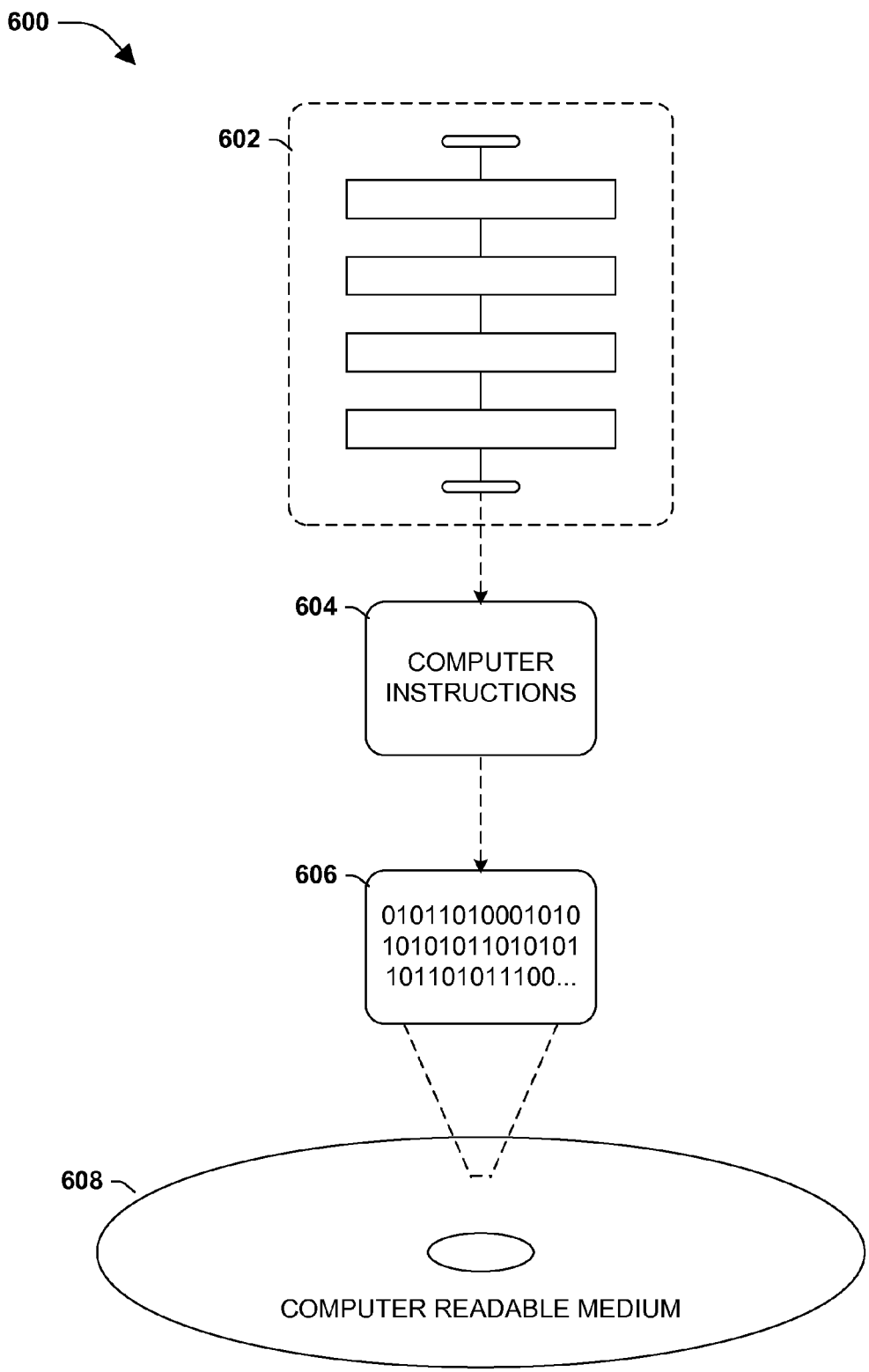
FIG. 6 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 6, wherein the implementation 600 comprises a computer-readable medium 608, such as a CD-R, DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the processor-executable computer instructions 604 are configured to perform a method 602, such as at least some of the exemplary method 100 of FIG. 1 and/or at least some of the exemplary method 200 of FIG. 2, for example. In some embodiments, the processor-executable instructions 604 are configured to implement a system, such as at least some of the exemplary system 300 of FIG. 3A, at least some of the exemplary system 330 of FIG. 3B, at least some of the exemplary system 360 of FIG. 3C, at least some of the exemplary system 400 of FIG. 4A, at least some of the exemplary system 430 of FIG. 4B, at least some of the exemplary system 440 of FIG. 4C, at least some of the exemplary system 450 of FIG. 4D and/or at least some of the exemplary system 470 of FIG. 4E, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
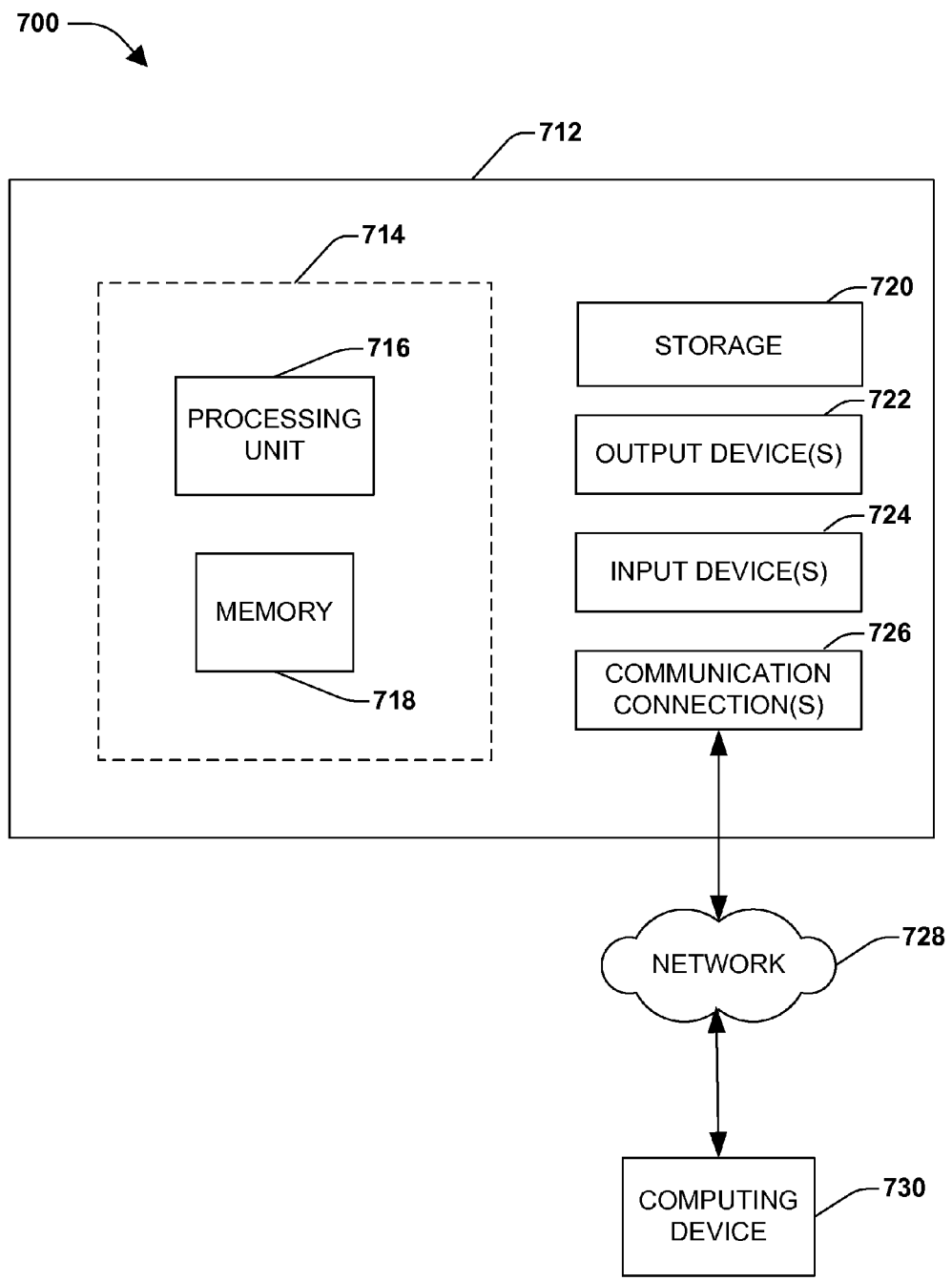
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 700 comprising a computing device 712 configured to implement one or more embodiments provided herein. In one configuration, computing device 712 includes at least one processing unit 716 and memory 717. Depending on the exact configuration and type of computing device, memory 717 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 717 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 717 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 717 may be comprised of multiple physical memory units located in different physical locations interconnected by a network.

Those skilled in the art will realize that storage devices utilized to store computer readable instructions may be distributed across a network. For example, a computing device 730 accessible via a network 727 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for implementing a reverse protocol launch, comprising:
   receiving from a first app, by a second app, a first context specifying a first contextual state of the first app before the second app is launched;
   creating an overloaded user interface element within a second user interface of the second app by assigning the first context and reverse protocol launch functionality to an existing user interface element within the second user interface;
   receiving an indication to return to the first app, wherein the indication is an invocation of the overloaded user interface element; and
   responsive to receiving the indication:
      implementing, by the second app, a reverse protocol launch, wherein the reverse protocol launch includes sending, by the second app to the first app, the first context received from the first app.

2. The method of claim 1, wherein the first context is sent to the first app for repopulation of a first user interface associated with the first app.

3. The method of claim 1, the first context indicative of at least one of:
   a scroll position of a first app user interface associated with the first app;
   a string specifying one or more user interface values for user interface elements within the first app user interface;
   user specified data populated within the first app user interface before the second app is launched;
   one or more search results populated within the first app user interface;
   a state of a user interface element within the first app user interface; or
   a playback state of multimedia content associated with the first app.

4. The method of claim 1, the first app comprising an operating system search interface of an operating system, and the second app comprising an app hosted by the operating system.

5. The method of claim 1, comprising:
   associating the first context and reverse protocol launch functionality with a new user interface element within the second user interface associated with the second app.

6. The method of claim 1, the existing user interface element comprising a back button user interface element.

7. The method of claim 1, comprising:
   before the implementing:
      identifying a transition from the second app to a third app; and
      responsive to identifying a back transition from the third app to the second app, exposing a user interface element, associated with reverse protocol launch functionality, within a second user interface associated with the second app; and
   the receiving an indication to return to the first app comprising identifying an invocation of the user interface element.

8. The method of claim 1, the implementing comprising implementing the reverse protocol launch as an app-to-app protocol but not through an operating system.

9. The method of claim 1, comprising:
sending, by the second app, a second context to a third app, the second context specifying a second contextual state of the second app before the third app is launched.

10. The method of claim 9, comprising:
responsive to receiving, from the third app, a reverse protocol launch command, repopulating a second user interface associated with the second app utilizing the second context.

11. A method for facilitating a reverse protocol launch, comprising:
responsive to identifying, by a first app, a request to launch a second app, sending a launch request to the second app to launch the second app into an operational state;
sending, by the first app, a first context to the second app, the first context specifying a first contextual state of the first app before the second app is launched; and
responsive to receiving, from the second app, a reverse protocol launch command comprising the first context:
repopulating a first user interface associated with the first app utilizing the first context;
storing to a navigation stack, by the first app, reverse protocol launch implementation data specifying that the second app provided the reverse protocol launch command; and
based on the navigation stack, preventing a reverse protocol launch from being performed from the first app.

12. The method of claim 11, comprising:
responsive to identifying a second launch request to launch a third app, sending a second launch request to the third app to launch the third app into a second operational state;
sending a second context to the third app, the second context specifying a second contextual state of the first app before the third app is launched; and
responsive to receiving, from the third app, a second reverse protocol launch command comprising the second context, repopulating the first user interface utilizing the second context.

13. The method of claim 12, the first context different than the second context.

14. The method of claim 11, the first context indicative of at least one of:
a scroll position of a first app user interface associated with the first app;
a string specifying one or more user interface values for user interface elements within the first app user interface;
user specified data populated within the first app user interface before the second app is launched;
one or more search results populated within the first app user interface;
a state of a user interface element within the first app user interface; or
a playback state of multimedia content associated with the first app.

15. A system for implementing a reverse protocol launch, comprising:
at least one processor; and
memory storing instructions that, upon execution by the at least one processor, are configured to:
receive from a first app, by a second app, a first context specifying a first contextual state of the first app before the second app is launched, wherein the first context includes at least search results and a scroll position;
identify a transition from the second app to a third app, the second app retaining the first context during the transition;
identify a back transition to the second app; and
implement, by the second app, a reverse protocol launch, wherein the reverse protocol launch includes sending, from the second app to the first app, the first context received from the first app.

16. The system of claim 15, the memory further comprising instructions configured to:
send, by the second app, a second context to a third app, the second context specifying a second contextual state of the second app before the third app is launched.

17. The system of claim 16, the memory further comprising instructions configured to:
responsive to receiving, from the third app, a reverse protocol launch command, repopulate a second user interface associated with the second app utilizing the second context.

18. The system of claim 15, the memory further comprising instructions configured to:
pass the first context to the first app for repopulation of a first app user interface associated with the first app.

19. The system of claim 15, the memory further comprising instructions configured to:
responsive to identifying the back transition-to the second app, expose a user interface element, associated with reverse protocol launch functionality, within a second user interface associated with the second app,
the reverse protocol launch implemented responsive to identifying an invocation of the user interface element.

20. The method of claim 1, wherein the first context includes at least search results and a scroll position.

* * * * *